(12) United States Patent
Kazami

(10) Patent No.: US 10,930,003 B2
(45) Date of Patent: Feb. 23, 2021

(54) CONTROL APPARATUS, IMAGING APPARATUS, CONTROL METHOD, AND STORAGE MEDIUM

(71) Applicant: CANON KABUSHIKI KAISHA, Tokyo (JP)

(72) Inventor: Yusuke Kazami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/400,118

(22) Filed: May 1, 2019

(65) Prior Publication Data

US 2019/0347816 A1 Nov. 14, 2019

(30) Foreign Application Priority Data

May 14, 2018 (JP) .............................. JP2018-093372

(51) Int. Cl.
| | | |
|---|---|---|
| G06T 7/60 | (2017.01) | |
| G06T 7/20 | (2017.01) | |
| G06T 7/80 | (2017.01) | |
| G06T 7/50 | (2017.01) | |
| H04N 5/235 | (2006.01) | |

(52) U.S. Cl.
CPC ................. *G06T 7/60* (2013.01); *G06T 7/20* (2013.01); *G06T 7/50* (2017.01); *G06T 7/80* (2017.01); *H04N 5/2353* (2013.01)

(58) Field of Classification Search
CPC ..... G06T 7/60; G06T 7/80; G06T 7/50; G06T 7/20; H04N 5/2353
USPC ......................................................... 348/148
See application file for complete search history.

(56) References Cited

U.S. PATENT DOCUMENTS

2017/0006228 A1* 1/2017 Takayanagi ........ H04N 5/23209
2017/0323458 A1* 11/2017 Lablans .................. G01S 19/48

FOREIGN PATENT DOCUMENTS

| JP | 2015-154409 A | 8/2015 |
| JP | 2016-122030 A | 7/2016 |

* cited by examiner

*Primary Examiner* — Nguyen T Truong

(74) *Attorney, Agent, or Firm* — Cowan, Liebowitz & Latman, P.C.

(57) ABSTRACT

A control apparatus includes a processor is configured to function as an information acquisition unit configured to acquire object size information from image data by a first method and a second method in continuous imaging, and an imaging control unit configured to perform an exposure while performing follow-up drive of an optical system so as to reduce a difference between the object size information and target size information.

19 Claims, 8 Drawing Sheets

CONTROL APPARATUS, IMAGING APPARATUS, CONTROL METHOD, AND STORAGE MEDIUM

BACKGROUND OF THE INVENTION

Field of the Invention

The present invention relates to an imaging apparatus (or image capturing apparatus) that can provide zooming panning (follow shot) of a moving object.

Description of the Related Art

One conventional imaging method for a camera is called "panning (follow shot)." The "panning" is a method of setting a low shutter speed in order to obtain a dynamic feeling of an object and of capturing images while the camera follows a horizontal movement of the object. For the object moving to or away from the camera, a "zooming panning" method is used that captures an image while changing a focal length with a zoom function in order to maintain constant the object size in the whole image. Such imaging as the "panning" and the "zooming panning" often sets a shutter speed lower than that set for the normal imaging, and requires an imaging technique because the object size needs to be maintained during exposure. For example, Japanese Patent Laid-Open No. ("JP") 2015-154409 discloses a method that provides "zooming panning" through follow-up drive of an imaging optical system to an object based on the object movement before the exposure so that the object falls within a predetermined range in a whole image during the exposure.

However, the method disclosed in JP 2015-154409 provides the follow-up drive of the imaging optical system only using the distance information change of the object from a specific timing. Thus, the object size can be maintained or cannot be arbitrary changed size of the object cannot be maintained. On the other hand, there is a method of detecting the object size in the image data in addition to the distance information of the object, and of maintaining the arbitrary size of the object. Then, a time interval (frame rate) of continuous imaging (or photographing) lowers in the continuous imaging since it takes a time to detect the object size in so-called continuous imaging. As a result, good zooming panning of the moving object cannot be unavailable.

SUMMARY OF THE INVENTION

The present invention provides a control apparatus, an imaging apparatus, a control method, and a storage medium, each of which can provide good zooming panning of a moving object.

A control apparatus according to one aspect of the present invention includes a processor is configured to function as an information acquisition unit configured to acquire object size information from image data by a first method and a second method in continuous imaging, and an imaging control unit configured to perform an exposure while performing follow-up drive of an optical system so as to reduce a difference between the object size information and target size information.

An imaging apparatus according to another aspect of the present invention includes an image sensor configured to photoelectrically convert an optical image formed via an optical system to output image data, and the above processor.

A control method according to another aspect of the present invention includes the steps of acquiring object size information from image data by a first method and a second method in continuous imaging, and performing exposure while performing follow-up drive of the optical system so as to reduce a difference between the object size information and target size information. A non-transitory computer-readable storage medium storing a program for causing a computer to execute the above steps also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments of the present invention.

Figure 1:
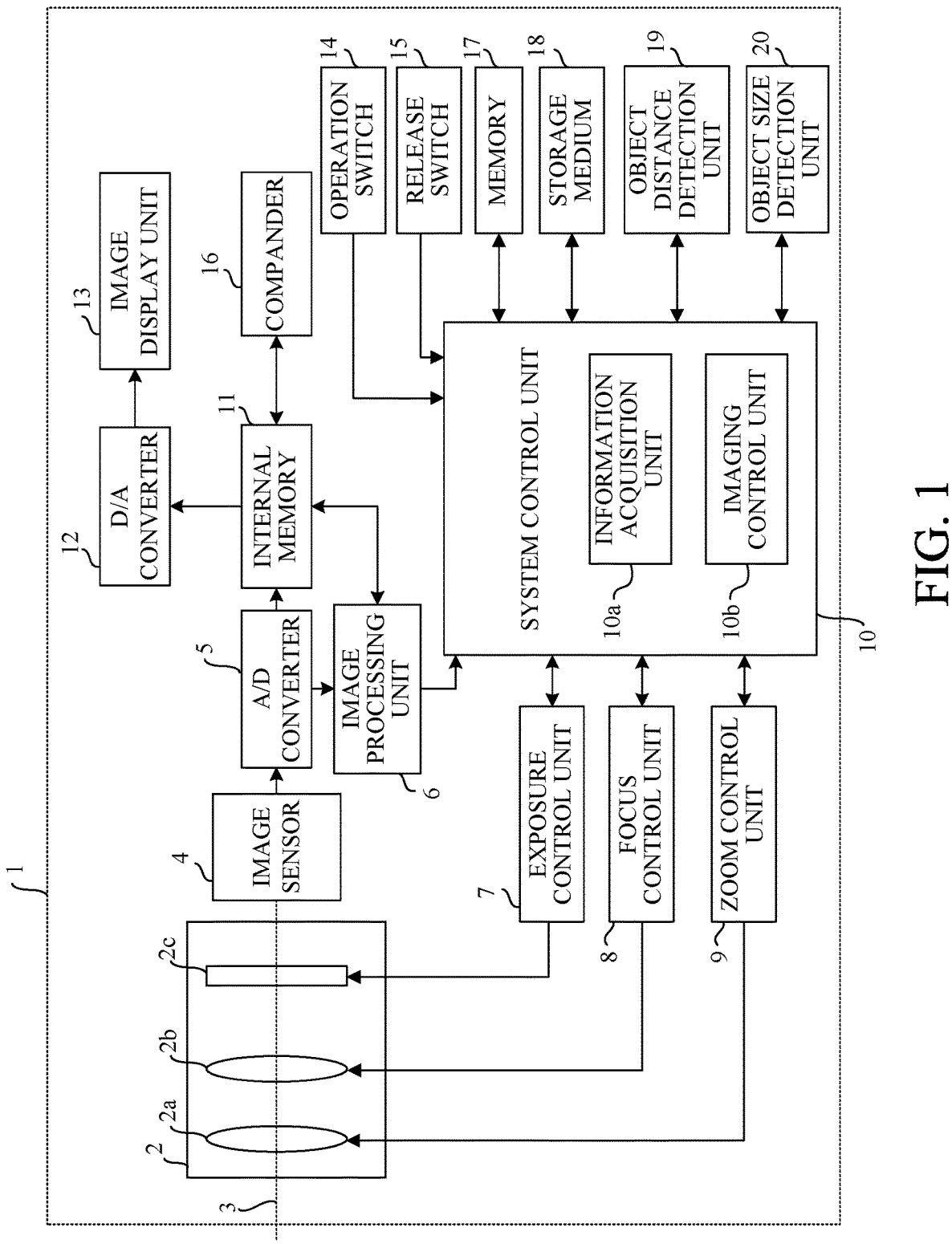
FIG. 1 is a block diagram of an imaging apparatus according to this embodiment.

Referring now to FIG. 1, a description will be given of a system configuration of an imaging apparatus according to this embodiment. FIG. 1 is a block diagram of the imaging apparatus 1. In this embodiment, the imaging apparatus 1 is, but not limited to, a digital camera, and is applicable to other imaging apparatuses such as a mobile phone with a camera.

In the imaging apparatus 1, the optical system (imaging optical system) 2 includes a zoom lens 2a, a focus lens 2b, a diaphragm shutter unit 2c, and the like. The zoom lens 2a and the focus lens 2b are movable along an optical axis 3 in the optical system 2. An image sensor 4 includes a CMOS sensor or a CCD sensor, photoelectrically converts an optical image (object image) formed via the optical system 2, and outputs an electric signal (image data). The image sensor 4 includes a plurality of photoelectric conversion elements sharing one micro lens, and the plurality of photoelectric conversion elements are configured to receive light passing through different pupil regions in the optical system 2. This configuration enables AF (autofocus) processing of an imaging surface phase difference method. An A/D converter 5 converts the electric signal (analog signal) output from the image sensor 4 into a digital signal.

An image processing unit 6 performs predetermined pixel interpolation processing, color conversion processing, and gamma processing for the data output from the A/D converter 5. The image processing unit 6 performs predetermined processing using the captured image data. A system control unit (control apparatus) 10 controls an exposure control unit 7 and a focus control unit 8 based on a result processed by the image processing unit 6. In other words, the system control unit 10 performs the AF processing of the imaging surface phase difference method and AE (auto-exposure) processing, etc. The image processing unit 6 performs predetermined arithmetic processing using the captured image data, and can perform AWB (auto white balance) processing based on the calculation result obtained by the above calculation processing.

The image data output from the A/D converter 5 via the image processing unit 6 or the image data output from the A/D converter 5 directly is written in an internal memory 11. The image data written in the internal memory 11 is displayed on an image display unit 13 via a D/A converter 12. The image display unit 13 is a TFT, an LCD, or the like. The image display unit 13 can realize the electronic viewfinder function by sequentially displaying the image data captured using the image display unit 13. In addition to displaying the image, the image display unit 13 displays a variety of menu items related to a variety of settings of the imaging apparatus 1 and imaging conditions such as a zoom magnification, an exposure setting, and the like with or without image display. The user can change the setting of the designated item by properly selecting the menu item and the imaging condition displayed on the image display unit 13 while operating an operation switch 14.

A compander (compression and decompression unit) 16 compresses and decompresses the image data by adaptive discrete cosine transformation (ADCT) or the like. In other words, the compander 16 reads the image data stored in the internal memory 11, performs compression processing or decompression processing, and writes the processed image data in the internal memory 11 again. The internal memory 11 is a storage unit for storing captured still image and motion image data, and has a sufficient storage amount for storing a predetermined number of still image data and motion image data for a predetermined time. Thereby, a large amount of image data can be written at a high speed in the internal memory 11 even in continuous imaging that consecutively captures a plurality of still image data. The internal memory 11 can also be used as a work area for the system control unit 10.

The exposure control unit 7 controls a diaphragm shutter unit 2c. The focus control unit 8 controls the focus lens 2b. The zoom control unit 9 controls the zooming operation by the zoom lens 2a and calculates the focal length information according to the current position of the zoom lens 2a. The current focal length information (focal length information acquired at a second timing) is stored in the internal memory 11 via the system control unit 10.

The system control unit 10 controls the entire imaging apparatus 1. The system control unit 10 also includes an information acquisition unit 10a and an imaging control unit 10b. The information acquiring unit 10a acquires object size information (detected object size information and estimated object size information) from image data by a first method and a second method in the continuous imaging. The imaging control unit 10b performs the exposure with the follow-up drive of the optical system 2 so as to reduce a difference between the object size information and the target size information. A memory (storage unit) 17 stores constants, variables, programs, and the like for operations of the system control unit 10. The memory 17 stores information (such as target size information and numerical information as a threshold for switching a variety of controls) necessary for the zooming panning.

The operation switch 14 and a release switch 15 are operation units used to input a variety of operation instructions of the system control unit 10, and include a single switch or a combination of switches, dials, a touch panel, a voice recognition device, etc. This embodiment provides the operation switch 14 with a switch, a zoom operation lever, a menu button, a set button, and the like for switching functional modes such as a power supply, an imaging mode, a reproduction mode and the like. In switching of the imaging mode, one of the plurality of imaging modes, such as still image capturing, motion image capturing, zooming panning or the like can be arbitrarily selected.

The release switch 15 is a member for inputting an imaging instruction from the user. More specifically, the release switch 15 can be pressed in two stages. For example, in the still image capturing, the user instructs an imaging preparation with a half-pressed operation (SW1) which is a pressing operation up to the first stage, and performs imaging with a fully pressed (SW2) operation as the pressing operation up to the second stage. In response to the half-pressed operation (SW1) as the imaging preparation instruction, the system control unit 10 controls the focus control unit 8 and the exposure control unit 7 for the imaging preparation operation such as the AF processing and the AE processing. In response to the fully pressed operation (SW2) as an imaging instruction, the system control unit 10 drives the diaphragm shutter unit 2c via the exposure control unit 7 for a control of taking the object image into the image sensor 4. More specifically, the system control unit 10 places the image sensor 4 in an accumulation state and opens and closes the shutter mechanism included in the diaphragm shutter unit 2c, thereby exposing the object image.

After the shutter mechanism returns to the closed state and the charge accumulation of the image sensor 4 is completed, the system control unit 10 reads the accumulated electric charges as a signal. The system control unit 10 performs a series of development processing and image processing for the signal read out of the image sensor 4 using the A/D converter 5, the image processing unit 6, the compander 16, and the internal memory 11, and generates image data. The generated image data is recorded as an image file in a storage medium 18. The processing from the imaging preparation instruction to the recording of the image file is referred to as imaging processing. The storage medium 18 can use a storage medium having a capacity sufficient for recording a plurality of image data, such as a hard disk drive and a flash memory.

The object distance detection unit 19 detects object distance information corresponding to the distance from the imaging apparatus 1 to the object. A description will now be given of a method of detecting object distance information by the object distance detection unit 19. There are a plurality of detection methods as methods for detecting object distance information, and one conceivable example is a detection method using the AF processing. For example, the AF processing by the imaging surface phase difference method is performed using the image sensor 4 having the function of the phase difference sensor. Thereby, the position of the focus lens 2b configured to focus on the object in the image can be specified based on the phase difference between the two signals obtained by dividing the light incident on the optical system 2 in two directions. The system control unit 10 can calculate the current (at the second timing) position (focal length information) of the zoom lens 2a and the object distance focused on the position of the focus lens 2b, and detect the object distance information.

The object size detection unit 20 detects information (object size information) on the size of the object in the image data. A description will now be given of a method of detecting the object size information by the object size detection unit 20. There are a plurality of detection methods as methods for detecting the object size information, and one of them is a detection method using a motion vector (motion vector information).

Figure 2A:
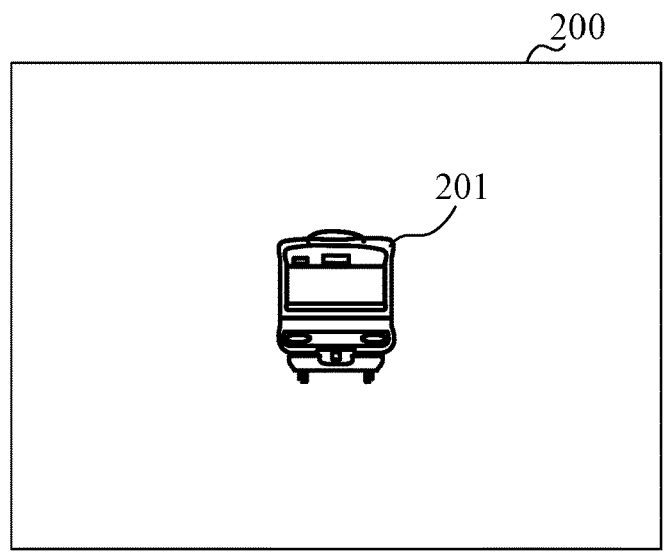
FIGS. 2A to 2C are explanatory diagrams of a method for detecting an object size according to this embodiment.
Figure 2B:
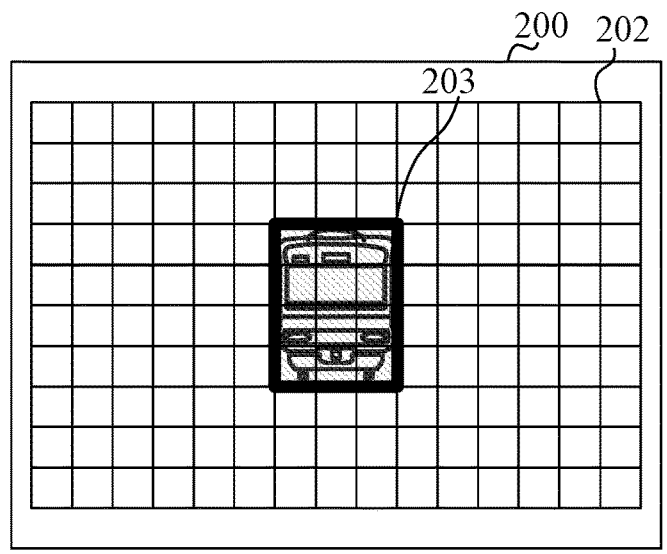
Figure 2C:
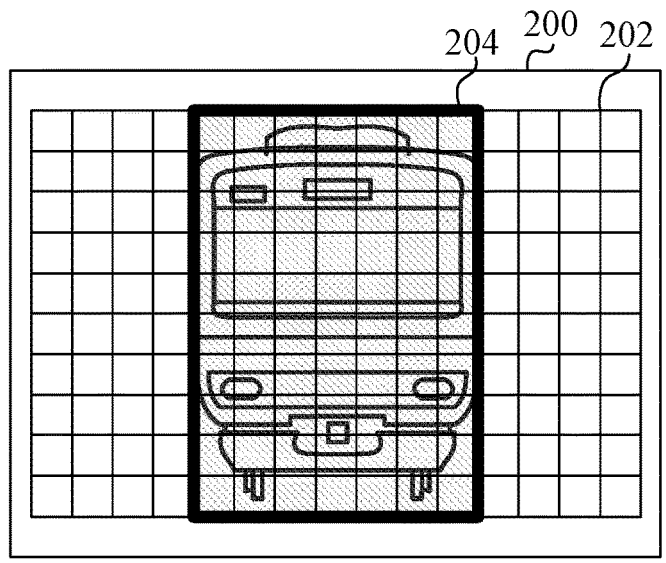

FIGS. 2A to 2C are explanatory diagrams of a method of detecting an object size using a motion vector. For example, as illustrated in FIG. 2A, assume an imaging scene in which an object 201 located at the center of an imaging view angle 200 is approaching to the user. Then, as illustrated in FIG. 2B, vectors detected by a vector detection frame 202 disposed for the imaging view angle 200 are classified into two types. One type is a vector in an object vector region 203 corresponding to part of the object 201 and the other type is a vector in a background vector region corresponding to background part (a region other than the object vector region 203 in the vector detection frame 202).

As the object 201 approaches to the user, the relationship between the object 201 and the vector in the image data changes as illustrated in FIGS. 2B and 2C. In other words, the object vector region 203 turns into an object vector region 204, and the ratio of the object vector region 204 in the vector detection frame 202 increases. More specifically, the number of regions in the horizontal direction of the object vector region 203 in FIG. 2B is 3 whereas the number of regions in the horizontal direction of the object vector region 204 in FIG. 2C is 7. Thus, the object size and its change in the image data can be detected based on the size of the object vector region and its change. The object size information detected by the object size detection unit 20 will now be referred to as detected object size information.

Figure 3A:
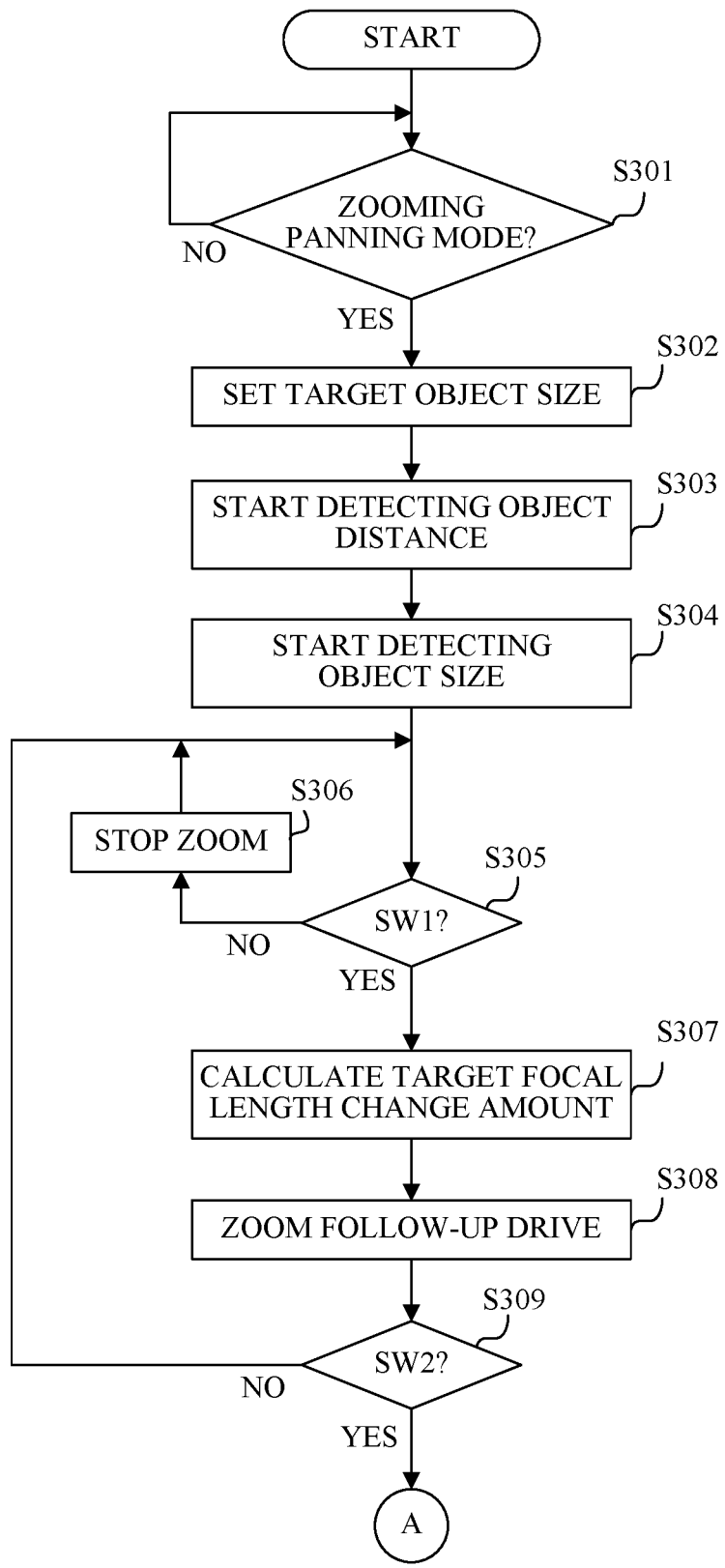
FIGS. 3A and 3B illustrate a flowchart of an imaging sequence of zooming panning according to this embodiment.
Figure 3B:
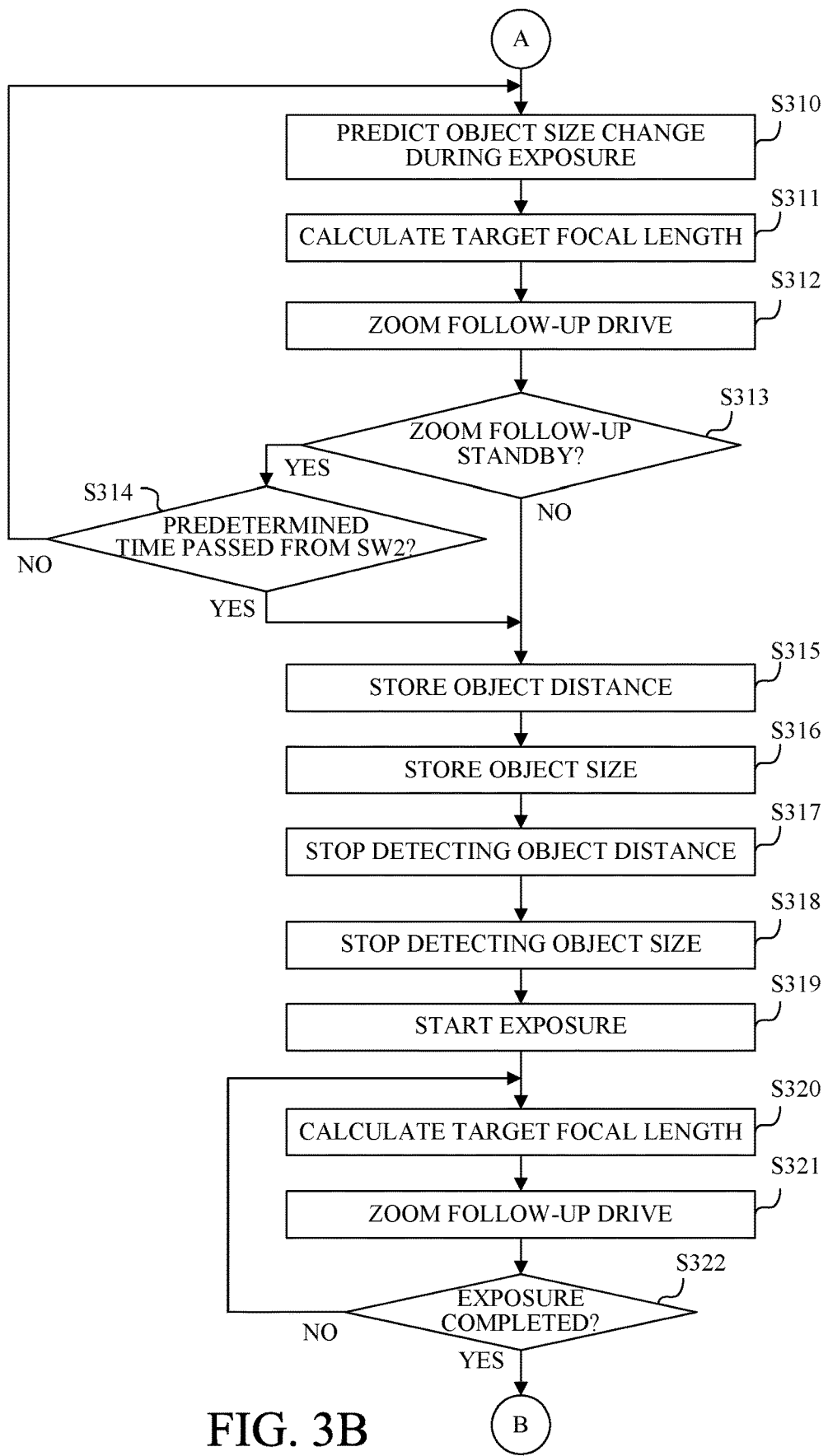

Referring now to FIGS. 3A and 3B, a description will be given of the operation of the zooming panning (imaging) in the imaging apparatus 1. FIGS. 3A and 3B illustrate a flowchart of the operation (imaging sequence) of the zooming panning. Each step in FIGS. 3A and 3B is executed by the system control unit 10 in accordance with the program stored in the memory 17.

When the power supply is turned on, the imaging apparatus 1 enters an operation instruction standby state waiting for the operation of the operation switch 14 by the user, after various initialization processing and the like are performed. First, in the step S301, the system control unit 10 determines whether or not there is an instruction to execute the zooming panning mode through the user operation of the operation switch 14. In response to the instruction to execute the zooming panning mode, the flow proceeds to the step S302. If there is no instruction to execute the zooming panning mode, the system control unit 10 continues the determination in the step S301.

In the step S302, the system control unit 10 acquires the target object size (target size information) as the size of the target object from the memory 17. The target size information means an object size to be targeted in maintaining constant the size of the object in the image data in the zooming panning. This embodiment previously stores as a fixed value the target size information in the memory 17 in the imaging apparatus 1. However, the present invention is not limited to this embodiment. For example, a plurality of target size information may be stored in the memory 17 in advance so that the user can arbitrarily select one of them. Alternatively, depending on the distance and speed of the object, the imaging apparatus 1 automatically selects or calculates the target size information in capturing an image, and drives the zooming lens 2a via the zoom control unit 9 so as to maintain the object size as the target object size.

Next, in the step S303, the system control unit 10 starts detecting the object distance (object distance information) using the object distance detection unit 19. This embodiment detects the object distance information based on the phase difference between the signals obtained by dividing the light incident from the optical system 2 into two directions using the image sensor 4 having the function of the phase difference sensor. Thus, whenever the image sensor 4 captures the image data to be displayed on the image display unit 13 after the object distance detection unit 19 starts detecting the object distance information in the step S303, the latest object distance information can be detected. The detected latest object distance information includes object distance detection time information indicating time when the object distance is detected, and these pieces of information are stored in the internal memory 11.

Next, in the step S304, the system control unit 10 starts detecting the object size information using the object size detection unit 20. This embodiment detects the object size information based on a motion vector (motion vector information). After the object size detection unit 20 starts detecting the object size information in the step S304, the latest object size information can be detected based on the difference between at least two consecutive image data captured by the image sensor 4 for display on the image display unit 13. The latest detected object size information contains object size detection time information meaning the time when the object size was detected, and these pieces of information are stored in the internal memory 11. The detection of the object size information is periodically repeated after the step S304 and accumulated in the internal memory 11.

Next, in the step S305, the system control unit 10 determines whether there is an instruction of the SW1 (imaging preparation start instruction) through the user operation of the release switch 15. If the SW1 is not instructed, the flow proceeds to the step S306. If it is determined in the step S308 described later that the zoom control unit 9 has already performed the zoom follow-up drive, the system control unit 10 stops the zoom panning drive in the step S306 and returns to the step S305. If there is an instruction of the SW1, the flow proceeds to the step S307.

In the step S307, the system control unit 10 calculates a target focal length change amount required for the object size on the image data to coincide with the target object size. The target focal length change amount is a difference between the current focal length and the focal length necessary for the object size on the image data to coincide with the target object size. More specifically, the system control unit 10 calculates target focal length change amount using the latest detected object size information detected by the object size detection unit 20, the target size information acquired in the step S302, and the current focal length information calculated by the zoom control unit 9.

In general, the relational expression between the focal length and the object size on the image data is expressed by the following expression (1). For simplicity purpose, assume that the object on the image data has the size in the horizontal direction.

$$\text{focal length (mm)} = \frac{\text{object distance (m)} \times \text{object size on image data (mm)}}{\text{width of object (m)}} \quad (1)$$

Since the target object is always the same object in the sequence of zooming panning, the width of the object in the expression (1) can be defined as a fixed value. In an instant event, the object distance is also unchanged and its value can be defined as a fixed value. In other words, the target focal length change amount can be calculated using the following expression (2).

$$\text{target focal length change amount (mm)} = \text{focal length (mm)} - \frac{\text{focal length (mm)} \times \text{target object size (mm)}}{\text{object size on image data (mm)}} \quad (2)$$

Next, in the step S308, the system control unit 10 provides the follow-up drive of the zoom lens 2a (zoom follow-up drive) using the zoom control unit 9 by the target focal length change amount calculated in the step S307. Next, in the step S309, the system control unit 10 determines whether or not there is an instruction of the SW2 (imaging start instruction) through the user operation of the release switch 15. If there is no instruction of the SW2, the flow returns to the step S305. If there is an instruction of the SW 2, the flow proceeds to the step S310.

In the step S310, the system control unit 10 predicts an object size change during exposure. In other words, during a time period from when the object size detection starts in the step S304 to when the step S310 is executed, the system control unit 10 predicts the object size change after the step S310, based on the history of the detected object size information. In this embodiment, the system control unit 10 extracts an arbitrary number of (such as ten) pieces of detected object size information and the object size detection time information from the latest detected object size information among the detected object size information detected until the step S310 is executed. The system control unit 10 predicts the object size change after the step S310 is executed, by approximating the plurality of pieces of information by the least squares method.

Next, in the step S311, the system control unit 10 calculates predicted object size information when step S311 is executed, based on the object size change predicted in the step S310. Then, the system control unit 10 calculates a target focal length used for the predicted object size to coincide with the target object size. The target focal length can be calculated based on the calculated predicted object size information, the target size information acquired in the step S302, and the focal length information calculated by the zoom control unit 9 when the step S311 is executed. The focal length when the step S311 is executed may be multiplied by a ratio between the target object size and the predicted object size (the target object size divided by the predicted object size). Instead of the target focal length, a target focal length change amount may be acquired and the subsequent follow-up drive may be performed based on the target focal length change amount.

Next, in the step S312, the system control unit 10 performs the follow-up drive of the zoom lens 2a using the zoom control unit 9 so as to obtain the target focal length calculated in the step S311. Next, in the step S313, the system control unit 10 determines whether the zoom follow-up standby is necessary. If the zoom follow-up standby is necessary, the flow proceeds to the step S314. If the zoom follow-up standby is unnecessary, the flow proceeds to the step S315.

Figure 6A:
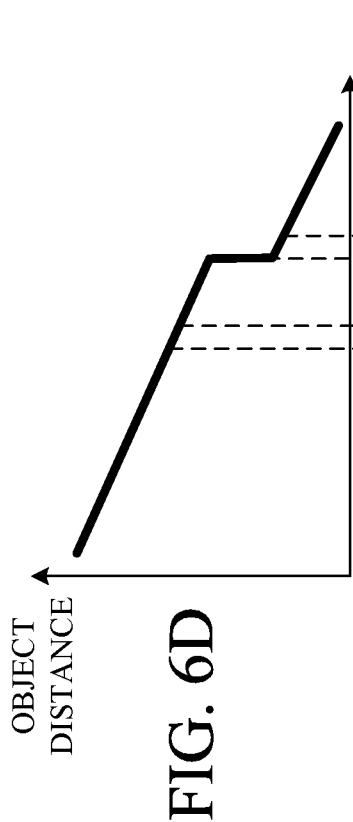
FIGS. 6A to 6F are explanatory diagrams of zoom follow-up standby processing according to this embodiment.
Figure 6B:
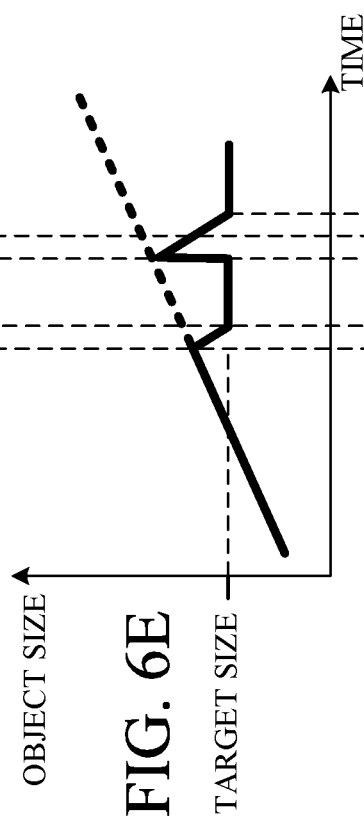
Figure 6C:
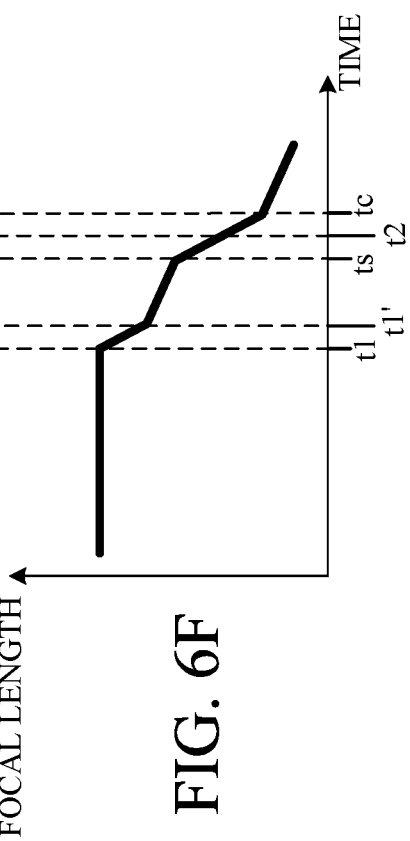

Referring now to FIGS. 6A to 6F, a description will be given of the zoom follow-up standby processing according to this embodiment. FIGS. 6A to 6F are explanatory diagrams of the zoom follow-up standby processing. Referring now to FIGS. 6A to 6C, a description will be given of a case where the zoom follow-up standby is unnecessary. FIG. 6A is an illustrative object distance change in the zooming panning. FIG. 6B is an illustrative object size change in the zooming panning. FIG. 6C is an illustrative focal length change in the zooming panning.

In FIGS. 6A to 6C, the abscissa axis shows time (same time base), t1 is a timing at which the SW1 is turned on by the user, and t2 is a timing at which the SW2 is turned on by the user. Now assume that the object as a target of the zooming panning is an object moving at a constant speed in a direction approaching to the imaging apparatus 1. As illustrated in FIG. 6A, the object distance change monotonically decreases in proportion to the time.

A description will now be given of the movement up to the timing t1 along the zooming panning sequence according to this embodiment. Since the zoom follow-up control is not performed up to the timing t1, the focal length is fixed to F0. In other words, the focal length is a fixed value F0 up to the timing t1 and the object distance monotonically decreases. Therefore, the object size on the image data increases in inverse proportion to the decrease in the object distance.

Next, as the zoom follow-up drive in the zooming panning is executed at the timing t1, the system control unit 10 uses the zoom control unit 9 to make the object size on the image data coincide with the target object size to provide the follow-up drive of the zoom lens 2a and to change the focal length. Due to the focal length change by the zoom follow-up control, it takes a time for the object size on the image data to coincide with the target object size. Strictly speaking, the object size coincides with the target object size at a timing t1'.

After the timing t1', the system control unit 10 changes the focal length using the zoom control unit 9 so that the latest detected object size detected by the object size detection unit 20 and the target object size coincide with each other, and waits for the timing t2. Thereafter, at the timing t2, the system control unit 10 changes the focal length using the zoom control unit 9, and determines whether a difference between the latest detected object size information and the target size information at the time falls within a predetermined range.

When the difference between the latest detected object size information and the target size information falls within the predetermined range, the system control unit 10 performs the exposure as it is. If the difference does not fall within the predetermined range, the system control unit 10 further changes the focal length using the zoom control unit 9 so that the detected object size information and the target size information coincide with each other and continues to determine whether or not the difference falls within the predetermined range. In the case of FIG. 6B, at the timing t2, the latest detected object size information coincides with the target size information or the difference falls within the predetermined range, so the exposure is performed as it is.

Figure 6D:
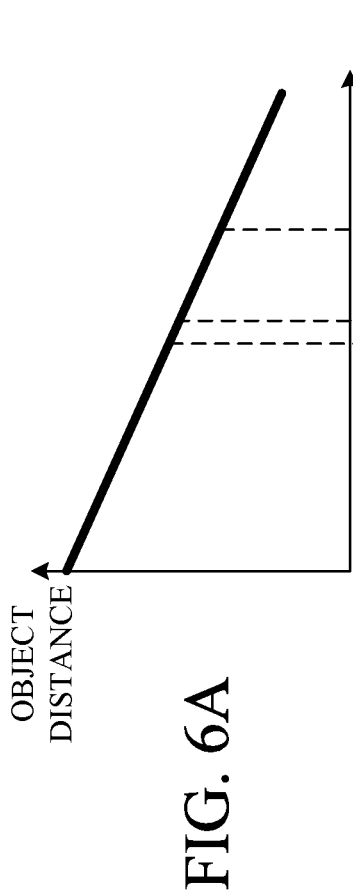
Figure 6E:
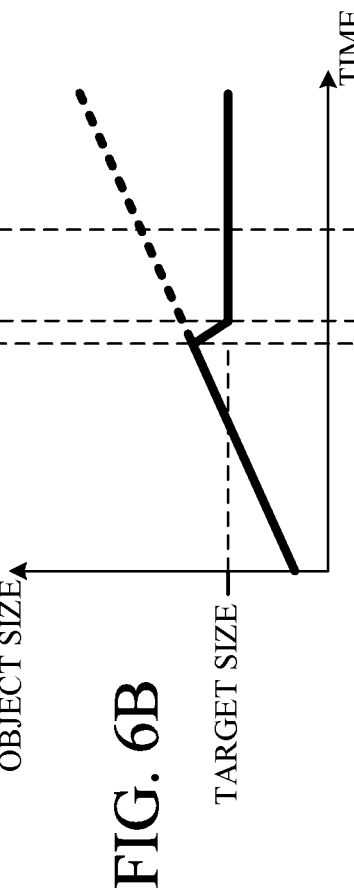
Figure 6F:
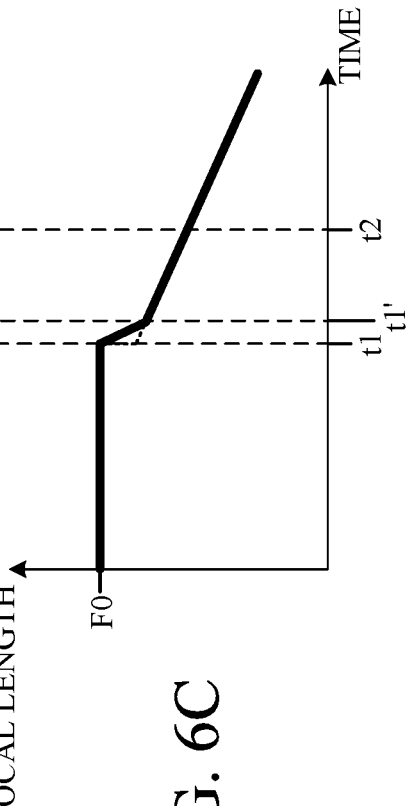

Referring now to FIGS. 6D to 6F, a description will be given of the zoom follow-up standby processing determined necessary. FIG. 6D is an illustrative object distance change in the zooming panning. FIG. 6E is an illustrative object size change in the zooming panning. FIG. 6F is an illustrative focal length change in the zooming panning. In FIGS. 6D to 6F, the abscissa axis is time (same time base). The timing t1 is the timing at which the SW1 is turned on by the user, and the timing t2 is the timing at which the SW2 is turned on. Now assume that an object as a target of the zooming panning is moving in a direction approaching to the imaging apparatus 1.

A description will now be given of the movement up to the timing t1 along the zooming panning sequence according to this embodiment. Since the zoom follow-up control is not performed up to the timing t1, the focal length is fixed to F0. At the timing t1, the object is moving at the constant speed in the direction approaching to the imaging apparatus 1. In other words, the focal length is a fixed value F0 up to the timing t1 and the object distance monotonically decreases. Therefore, the object size on the image data increases in inverse proportion to the decrease in the object distance.

Next, when the zooming follow-up drive in the zooming panning is executed at the timing t1, the system control unit 10 uses the zoom control unit 9 for the follow-up drive of the zoom lens 2a and changes the focal length so that the object size on the image data coincides with the target object size. Due to the focal length change by the zoom follow-up control, it takes a time for the object size on the image data to coincide with the target object size. Strictly speaking, the object size coincides with the target object size at timing t1'.

After the timing t1', the system control unit 10 changes the focal length using the zoom control unit 9 so that the latest detected object size detected by the object size detection unit 20 and the target object size coincide with each other and waits for the timing t2. Now assume that the moving speed of the object significantly changes (in the acceleration direction) at a timing ts earlier than the timing t2, and the object distance sharply changes as illustrated in FIG. 6D. In this case, the object size on the image data suddenly increases, and temporarily becomes a state where it does not coincide with the target object size or an unfollowable state.

Thereafter, the system control unit 10 drives the zoom lens 2a using the zoom control unit 9 and changes the focal length so that the object size on the changed image data coincides with the target object size. When the predetermined time elapses (at a timing tc), the object size and the target object size again coincide with each other.

If the user instructs the SW2 between the timing ts and the timing tc or when the timing t2 occurs at the timing as illustrated in FIG. 6F, the object size on the image data and target object size do not coincide with each other. When the exposure is started as it is, the exposure proceeds while the object size on the image data is changing and the captured image becomes an image having a blurred outline of the object (or a badly follow-shot image).

Accordingly, as described above, the system control unit 10 in this embodiment changes the focal length through the zoom control unit 9 at the timing t2, and determines whether or not the difference between the latest detected object size information and the target size information at that time falls within a predetermined range. When the difference falls within the predetermined range, the system control unit 10 performs exposure as it is. If the difference does not fall within the predetermined range, the system control unit 10 further changes the focal length using the zoom control unit 9 so that the detected object size information coincides with the target size information, and continues to determine whether the difference falls within the predetermined range. In the example of FIG. 6E, since the difference between the latest detected object size information and the target size information does not fall within the predetermined range at the timing t2, the system control unit 10 does not perform the exposure as it is.

Referring now to FIGS. 6A to 6F, a description will be given of the zoom follow-up standby processing according to this embodiment. In this embodiment, the system control unit 10 makes a determination depending on whether or not the difference between the latest detected object size information and the target size information falls within a predetermined range. However, the present invention is not limited to this embodiment. For example, the system control unit 10 may determine that the zoom follow-up standby processing is necessary at the timing t2, when the object distance changing trend (in the object speed) does not converge within a predetermined range (or it is not a constant speed) by acquiring the past object distance changing trend.

This embodiment previously stores the predetermined range in the memory 17 in the imaging apparatus 1 as a fixed value, but the present invention is not limited to this embodiment. For example, a plurality of prescribed ranges may be previously stored in the memory 17 so that the user can arbitrarily select any one of them and determine which one of the imaging duration and the follow-up accuracy is to be prioritized. This embodiment may change the range according to the exposure time period (so-called shutter speed). For example, when the exposure time period is long, the predetermined range is changed narrower. This is because, for example, where a ratio of a follow-up delay time when the exposure starts is small in the sufficiently long exposure time period, so that it may not significantly affect the image captured by the zooming panning.

Where the follow-up degree is low or the object size on the image is significantly changed due to the delay of the follow-up drive of the zoom lens as the object size changes, the system control unit 10 according to this embodiment does not immediately start the exposure even when receiving the imaging instruction. Thereby, the exposure is less likely to start when the zoom lens cannot follow the object movement.

In the step S314 in FIG. 3B, the system control unit 10 determines whether the time period from when the instruction of the SW2 from the user is executed in the step S309 to when the step S314 is executed exceeds the predetermined time period t (the predetermined time t has elapsed since the SW2). If the time period exceeds the predetermined time period t, the flow proceeds to the step S315. If the time period has not exceeded the predetermined time period t, the flow returns to the step S310 to continue the process. In other words, when the time period during which it is determined that the zoom follow-up standby is necessary in the step S313 is less than the predetermined time period t, the system control unit 10 repeatedly executes the processing in the steps S310 to S312.

In the step S315, the system control unit 10 stores as the last imaging object distance information in the internal memory 11 the latest information among the object distance information detected from when the detection of the object distance starts in the step S303 to when the step S315 is executed. Next, in the step S316, the system control unit 10 stores as the last imaging object size information in the memory 11 the latest information among the detected object size information detected from when the detection of the object size starts in the step S304 to when the step S316 is executed.

Next, in the step S317, the system control unit 10 stops detecting the object distance information through the object distance detection unit 19. Next, in the step S318, the system control unit 10 stops detecting the object size information through the object size detection unit 20. Next, in the step S319, the system control unit 10 starts the exposure (imaging).

Next, in the step S320, the system control unit 10 calculates the predicted object size when the step S320 is executed, based on the object size change predicted in the step S310. Then, the system control unit 10 calculates a target focal length necessary for the predicted object size to coincide with the target object size. The target focal length is calculated based on the calculated predicted object size information, the target size information acquired in the step S302, and the focal length information calculated by the zoom control unit 9 when the step S320 is executed.

Next, in the step S321, the system control unit 10 performs the follow-up drive of the zoom lens 2a through the zoom control unit 9 so as to obtain the target focal length calculated in the step S320. Next, in the step S322, the system control unit 10 determines whether or not the exposure started in the step S319 has been completed. When the exposure is completed, the procedure shifts to the zooming panning continuous-imaging sequence described later. If the exposure has not been completed, the flow returns to the step S320 to continue the processing. In other words, while the exposure started in the step S319 continues, the system control unit 10 realizes the zoom driving during exposure by repeatedly executing the processing in the steps S320 and S321.

Thus, in the zooming imaging sequence according to this embodiment, the system control unit 10 performs the zoom follow-up control at the timing of the SW1 so that the latest detected object size and the target object size coincide with each other, and starts changing the focal length. Then, at the timing of the SW2, the system control unit 10 changes the timing of executing the exposure (imaging) according to the difference between the latest detected object size and the target object size. Thereby, the zoom follow-up accuracy for maintaining constant the object size during exposure can be improved.

Figure 4A:
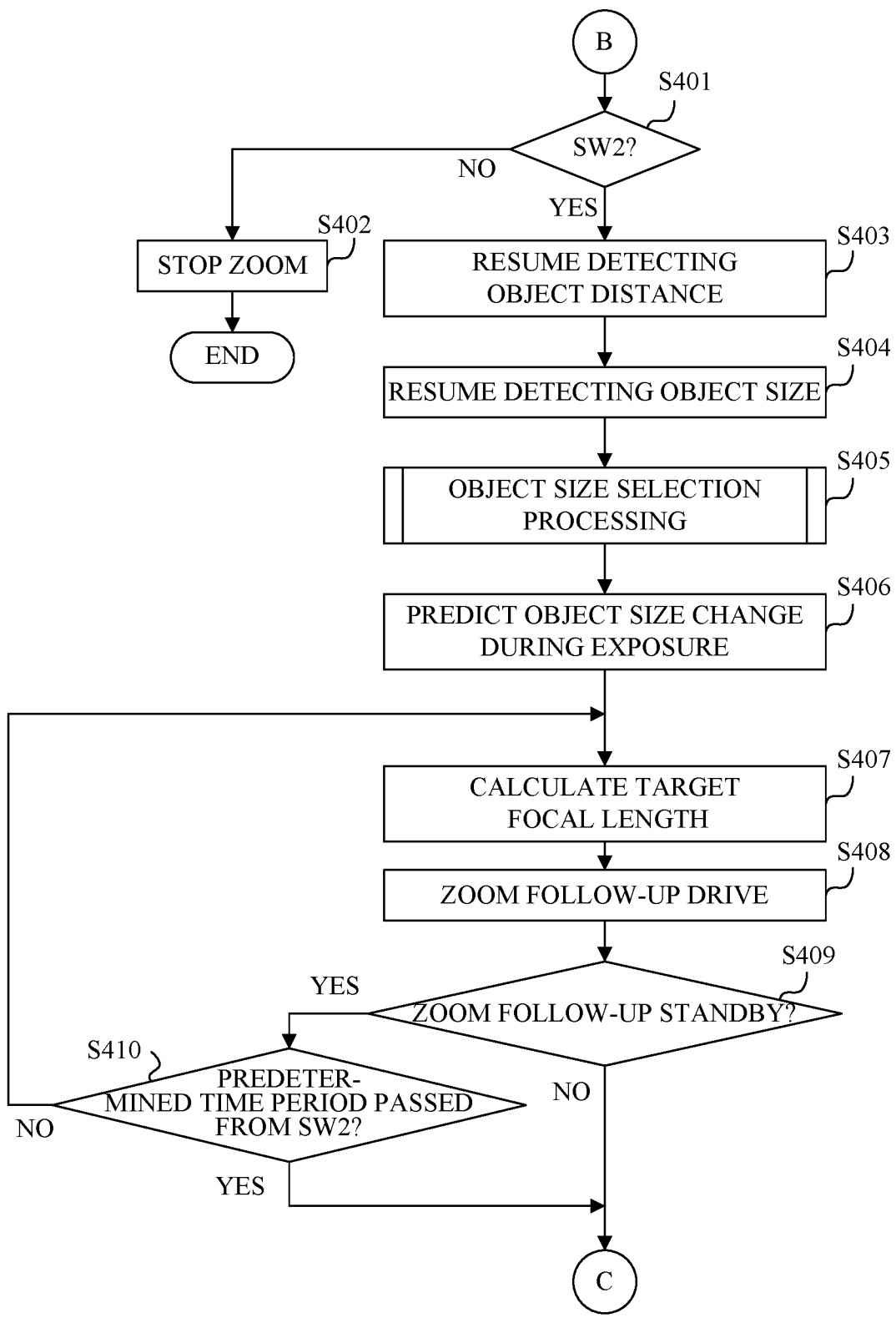
FIGS. 4A and 4B illustrate a flowchart of a continuous imaging sequence of the zooming panning according to this embodiment.
Figure 4B:
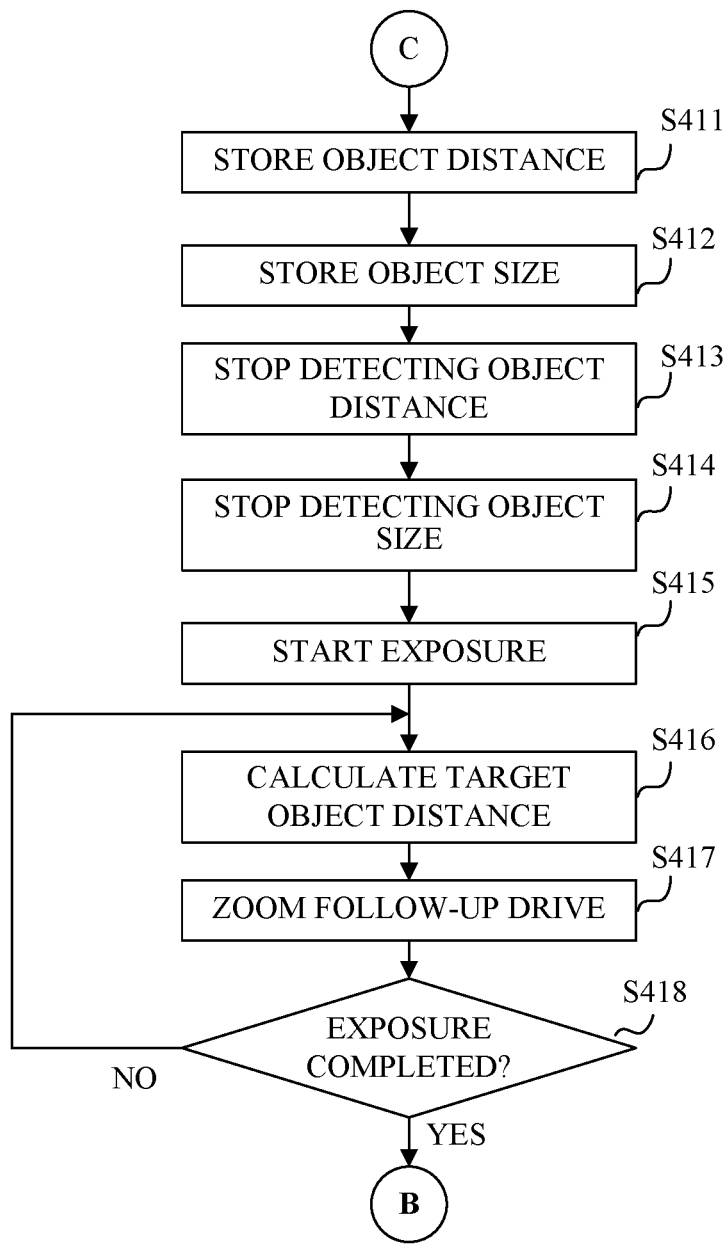

Referring now to FIGS. 4A and 4B, a description will be given of the operation of the zooming panning continuous-imaging of the imaging apparatus 1. FIGS. 4A and 4B illustrate a flowchart of the operation (continuous imaging sequence) of the zooming panning. Each step in FIGS. 4A and 4B is executed by the system control unit 10 in accordance with a program stored in the memory 17.

The imaging apparatus 1 proceeds to the step S401 following the completion of the above zooming panning sequence. In the step S401, the system control unit 10 determines whether there is an instruction of the SW2 (imaging continuation instruction) through the user operation of the release switch 15. When there is an instruction of the SW2, the flow proceeds to the step S403. If there is no instruction of the SW2, the flow proceeds to the step S402.

If it is determined in the step S402 that the zoom control unit 9 has already performed the zoom follow-up drive in the above zooming panning sequence, the system control unit 10 stops the zoom follow-up drive and performs zooming panning continuous-imaging sequence.

In the step S403, the system control unit 10 restarts detecting the object distance information through the object distance detection unit 19 stopped in the step S317 of the above zooming panning sequence or in the step S413 described later. Next, in the step S404, the system control unit 10 restarts detecting the object size information through the object size detection unit 20 stopped in the step S318 of the above zooming panning sequence or the step S414 described later. Next, in the step S405, the system control unit 10 executes the object size selection processing that determines whether to acquire object size information in the zooming panning continuous-imaging sequence from any one of two methods (first method and second method) described later.

Figure 5:
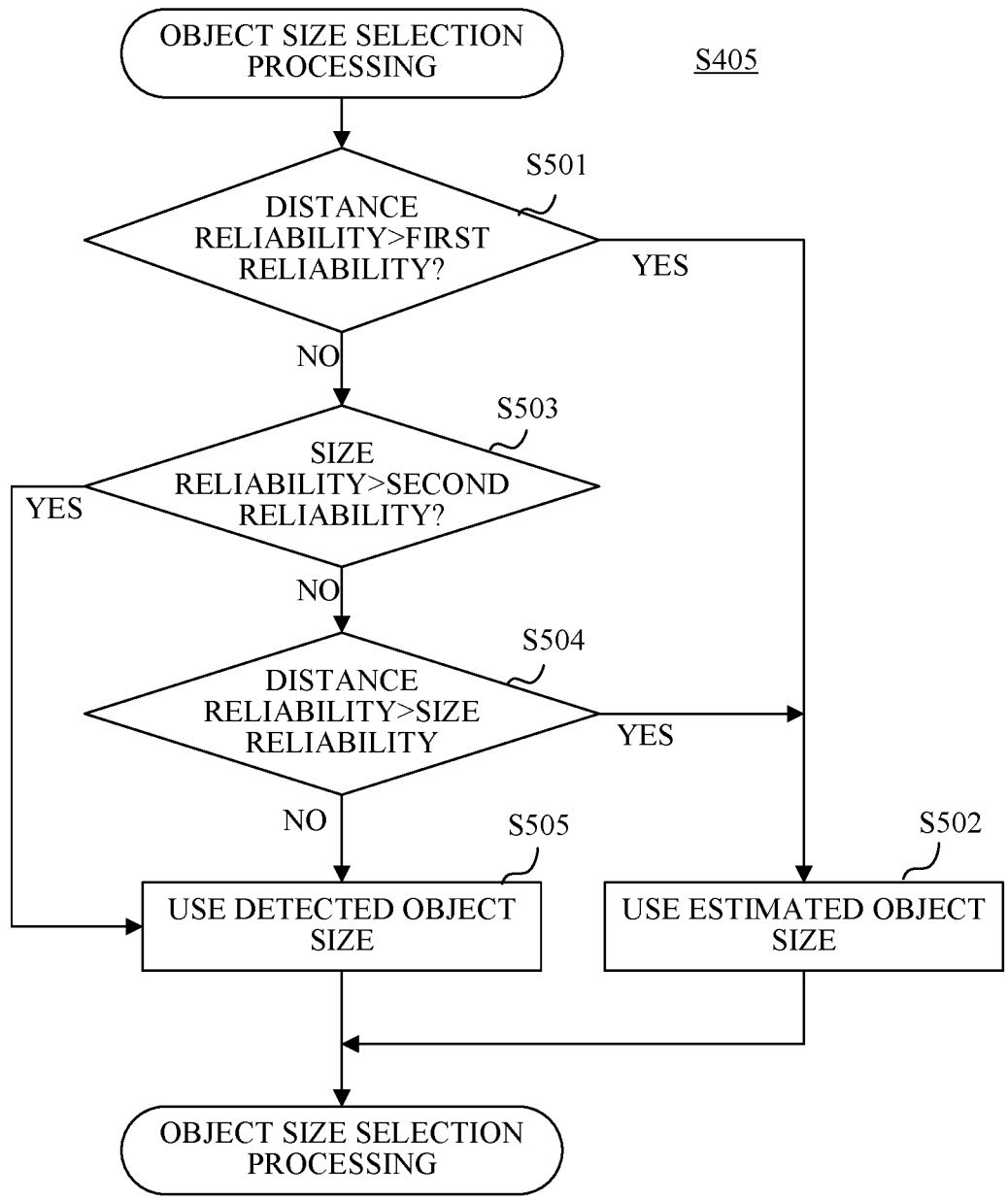
FIG. 5 is a flowchart of an object size selection processing sequence according to this embodiment.

Referring now to FIG. 5, a description will be given of the object size selection processing (object size selection processing sequence) in the zooming panning continuous-imaging sequence. FIG. 5 is a flowchart of the object size selection processing sequence (step S405). Each step in FIG. 5 is executed by the system control unit 10 in accordance with a program stored in the memory 17.

First, in the step S501, the system control unit 10 determines the reliability (distance reliability) of the object distance information. In this embodiment, the system control unit 10 determines the reliability of the object distance based on the difference between the latest object distance information and the predicted object distance information. Herein, the latest object distance information is the latest object distance information in the object distance information detected from when the detection of the object distance is resumed in the step S403 to when the step S501 is executed. The predicted object distance information is the predicted object distance information in the step S501 estimated from the object distance information in the last exposure (step S315 or S411 described later). In this embodiment, the reliability is higher as the difference is smaller between the latest object distance information and the predicted object distance information. In other words, in the step S501, if the reliability of the object distance (distance reliability) is higher than the first reliability (first threshold) previously stored in the memory 17, the flow proceeds to the step S502. When the reliability of the object distance is lower than the first reliability (first threshold), the flow proceeds to the step S503.

In the step S502, the system control unit 10 estimates the object size based on the latest object distance information acquired in the step S501 and the object distance information in the last exposure (step S315 or S411 described later). A description will now be given of a method of estimating the object size from the object distance information. In general, the object size on the image data is expressed by the following expression (3).

$$\text{object size on image data} = \frac{\text{focal length (mm)} \times \text{width of object (m)}}{\text{object distance (m)}} \quad (3)$$

Since the target object is always the same object in the zooming panning continuous-imaging sequence, the width of the object in the expression (3) can be defined as a fixed value. Thus, the relational expression between the object distance information in the last exposure (step S315 or S411 described later) and the latest object distance information on the image data is expressed by the following expression (4).

$$\frac{\text{object size in the last exposure (mm)} \times \text{object distance in the last exposure (m)}}{\text{focal length in the last exposure (mm)}} = \frac{\text{the latest object size (mm)} \times \text{the latest object distance (m)}}{\text{the latest focal length (mm)}} \quad (4)$$

In other words, the latest object size can be estimated using the following expression (5).

$$\text{The latest object size (mm)} = \frac{\text{object size in the last exposure (mm)} \times \text{object distance in the last exposure (m)} \times \text{the latest focal length (mm)}}{\text{focal length in the last exposure (mm)} \times \text{the latest object distance (m)}} \quad (5)$$

Thus, in the step S502, the system control unit 10 selects as the object size information the object size (estimated object size information) estimated using the expression (5). In this step, unlike the detection of the object size information in the step S304, since a plurality of image data are not required, the object size information can be acquired earlier than the method in the step S304 (and a time period from the imaging end (S322) to the acquisition of the object size can be made shorter).

In the step S503, the system control unit 10 determines the reliability of the detected object size information. In this embodiment, the system control unit 10 determines the reliability of the detected object size based on the difference between the latest detected object size information and the predicted object size information. Herein, the latest detected object size information is the latest detected object size information among the detected object size information detected from when the detection of the object size is resumed in the step S404 to when the step S503 is executed. The predicted object size information is the predicted object size information in the step S503 estimated from the object size information in the last exposure (step S316 or S412 described later). In this embodiment, the smaller the difference is between the latest detected object size information and the predicted object size information, the higher the reliability is. In other words, in the step S503, if the reliability of the object size is higher than the second reliability (second threshold) previously stored in the memory 17, the flow proceeds to the step S505. If the reliability of the object distance is lower than the second reliability (second threshold), the flow proceeds to the step S504.

In the step S504, the system control unit 10 determines whether the reliability of the object distance information calculated in the step S501 is higher than the reliability of the object size information calculated in the step S503. When the reliability of the object distance information is higher than the reliability of the object size information, the flow proceeds to step S502. When the reliability of the object distance information is lower than the reliability of the object size information, the flow proceeds to the step S505. In the step S505, the system control unit 10 selects the latest detected object size information acquired in the step S503 as the object size information.

Next, in the step S406 in FIG. 4A, the system control unit 10 predicts an object size change during the exposure (object size change after the step S406 is executed). In other words, the system control unit 10 predicts the object size change based on any new information of the object size information stored in the internal memory 11 in the step S316 or S411 and the object size information selected in the step S405. In this embodiment, the system control unit 10 predicts the object size change after the step S406 is executed by linearly approximating them.

Next, in the step S407, the system control unit 10 calculates the predicted object size when the step S407 is executed based on the object size change predicted in the step S406. Then, the system control unit 10 calculates a target focal length necessary for the predicted object size to coincide with the target object size. In this embodiment, the target focal length is calculated based on the predicted object size information, the target size information acquired in the step S302, and the focal length information calculated by the zoom control unit 9 when the step S407 is executed.

Next, in the step S408, the system control unit 10 performs the follow-up drive of the zoom lens 2a through the zoom control unit 9 so as to obtain the target focal length calculated in the step S407. Next, in the step S409, the system control unit 10 determines whether or not the zoom follow-up standby is necessary. Where the zoom follow-up standby is necessary (when the follow-up degree falls out of the predetermined range), the flow proceeds to the step S410. When the zoom follow-up standby is unnecessary (when the follow-up degree falls within the predetermined range), the flow proceeds to the step S411. The zoom follow-up standby is the same as the above step S313.

This embodiment executes the zooming follow-up standby in the step S409, but the present invention is not limited to this embodiment. For example, in order to shorten the time required for the zooming panning continuous-imaging sequence (the imaging time per a single image (frame rate) in the continuous imaging), the zoom follow-up standby may be omitted. Alternatively, the user may select whether or not to execute the zoom follow-up standby in the zooming panning continuous-imaging sequence.

In the step S410, the system control unit 10 determines whether or not a time period from when the user instruction of the SW2 is executed in the step S401 to when the step S410 is executed exceeds a predetermined time period t (the predetermined time has elapsed since the SW2 operation). If this time period exceeds the predetermined time period t, the flow proceeds to the step S411. If this time period does not exceed the predetermined time period t, the flow returns to the step S407 to continue the processing. In other words, the system control unit 10 repeatedly executes the processing of the steps S406 and S407 as long as the time period during which the zoom follow-up standby is determined necessary in the step S409 is less than the predetermined time period t.

In the step S411, the system control unit 10 stores in the internal memory 11 the latest object distance information among the object distance information detected from when the detection of the object distance is resumed in the step S403 to when the step S411 is executed. Next, in the step S412, the system control unit 10 stores the object size information selected in the step S405 in the internal memory 11. Next, in the step S413, the system control unit 10 stops detecting the object distance information through the object distance detection unit 19. Next, in the step S414, the system control unit 10 stops detecting the object size information through the object size detection unit 20. Next, in the step S415, the system control unit 10 starts the exposure (imaging).

Next, in the step S416, the system control unit 10 calculates the predicted object size when the step S416 is executed based on the object size change predicted in the step S406. Then, the system control unit 10 calculates a target focal length necessary for the predicted object size to coincide with the target object size. In this embodiment, the target focal length is calculated based on the predicted object size information, the target size information acquired in the step S302, and the focal length information managed by the zoom control unit 9 when the step S416 is executed.

Next, in the step S417, the system control unit 10 performs the follow-up drive of the zoom lens 2a via the zoom control unit 9 to obtain the target focal length calculated in the step S416. Next, in the step S418, the system control unit 10 determines whether or not the exposure started in the step S415 has been completed. If the exposure is completed, the flow returns to the step S401 and the system control unit 10 again executes the zooming panning continuous-imaging sequence. If the exposure has not been completed, the flow returns to the step S416 to continue the processing. In other words, while the exposure started in the step S415 is continued, the system control unit 10 realizes the zoom follow-up drive during the exposure by repeatedly executing the processing in the steps S416 and S417.

Thus, the control apparatus (system control unit 10) in this embodiment includes an information acquisition unit 10a and an imaging control unit 10b. The information acquiring unit 10a acquires the object size information from the image data by the first method and the second method in the continuous imaging. The imaging control unit 10b performs the exposure while performing the follow-up drive of the optical system 2 so as to reduce the difference between the object size information and the target size information.

A time period from the last imaging completion to the acquisition of the object size information by the second method is shorter than that by the first method. In this embodiment, the first method is a method of detecting the object size based on a plurality of image data as described in the step S304. The second method is a method of acquiring the object size by estimating the object size based on the object distance information as described in the step S502. If the second method can acquire the object size faster than the first method, the combination of the first method and the second method is not limited to this embodiment. Where a time period used for the first method to acquire the object size is longer than that of the second method, the first method is used to capture a first image and the second method is used to capture second and subsequent images. Thereby, the continuous imaging interval can be made shorter (or the frame speed can be made higher).

The first method may be a method of acquiring the object size information based on motion vector information in the image data. The second method may be a method of acquiring object size information based on object distance information and focal length information. Herein, the object distance information is information indicating object distance information at each of a first timing (past) and the second timing (present). The focal length information is information indicating focal length information at each of the first timing and the second timing. The second method may be a method for acquiring the object size information at the second timing based on the object distance information, the focal length information, and the object size information acquired by the first method at the first timing. In capturing the third and subsequent images, the second method acquires the object size information at a third timing based on the object distance information, the focal length information, and the object size information acquired by the second method at the second timing. Even in this case, since the object size at the second timing is based on the object size acquired by the first method, it is considered that the object size information is acquired based on the object size information acquired by the first method in capturing the third and subsequent images.

In the combination of the first method and the second method, the second method may be faster than the first method and the first method may be more accurate than the second method.

The imaging control unit may performs the exposure based on the object size information acquired by the first method in capturing the first image in the continuous imaging, and performs the exposure based on the object size information acquired by the second method in capturing the second and subsequent images in the continuous imaging. The imaging control unit performs the exposure based on the object size information acquired by the first method or the second method selected according to the predetermined condition in capturing the second and subsequent images. The predetermined condition contains at least one of the reliability of the object distance information and the reliability of the object size information.

The reliability of the object distance information may be calculated based on the difference between the object distance information at the second timing (present) predicted from the object distance information detected at the first timing (past) and the object distance information at the second timing. The reliability of the object size information is calculated based on the difference between the object size information at the second timing predicted from the object size information acquired at the first timing and the object size information detected at the second timing. Herein, the object size information acquired at the first timing is the object size information detected by the object size detection unit 20 at the first timing or the object size information estimated by the system control unit 10 in the second method at the first timing. The object size information detected at the second timing is the object size information detected by the object size detection unit 20 at the second timing.

When the reliability of the object distance information is higher than the first reliability, the imaging control unit may perform the exposure based on the object size information acquired by the second method (S501, S502). When the reliability of the object size information is higher than the second reliability, the imaging control unit may perform the exposure based on the object size information acquired by the first method (S503, S505). The first reliability may be higher than the second reliability. When the reliability of the object distance information is lower than the reliability of the object size information, the imaging control unit may perform the exposure based on the object size information acquired by the first method (S504, S505). When the reliability of the object distance information is higher than the reliability of the object size information, the imaging control unit may perform the exposure based on the object size information acquired by the second method (S504, S502).

As described above, this embodiment selects or determines the object size information acquired by the two methods for use with the zoom follow-up drive of the next imaging according to the reliabilities of the object distance information and the object size information. The object size information acquired by the two methods is the estimated object size information estimated from the object distance information and the detected object size information detected by the object size detection unit 20. Thereby, the accuracy of the object size information used for the zoom follow-up drive can be higher than that using only the detected object size information detected by the object size detection unit 20.

When a time period necessary for the object distance detection unit 19 to detect the object distance is shorter than a time period necessary for the object size detection unit 20 to detect the object size, the estimated object size information estimated from the object distance information detected by the object distance detection unit 19 may be used. As a result, it becomes possible to shorten a time period necessary for the zooming panning continuous-imaging sequence (imaging time (frame rate) per a single image in the continuous imaging).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the above embodiments can provide a control apparatus, an imaging device, a control method, and a storage medium, each of which can perform good zooming panning of a motion object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-93372, filed on May 14, 2018, which is hereby incorporated by reference herein in its entirety.

What is claimed is:

1. A control apparatus comprising a processor configured to function as:
    an information acquisition unit configured to acquire object size information indicating an object size in an image from image data by a first method and a second method in continuous imaging, and
    an imaging control unit configured to perform an exposure while performing follow-up drive of an optical system so as to reduce a difference between the object size information and target size information
    wherein a time period from a completion of last imaging to an acquisition of the object size information by the second method is shorter than a time period from a completion of last imaging to an acquisition of the object size information by the first method.

2. The control apparatus according to claim 1, wherein the second method is a method of acquiring the object size information based on the object size information acquired by the first method.

3. The control apparatus according to claim 1, wherein the first method is a method of acquiring the object size information based on a plurality of the image data.

4. The control apparatus according to claim 1, wherein the first method is a method of acquiring the object size information based on the motion vector information of the image data.

5. The control apparatus according to claim 1, wherein the second method is a method of acquiring the object size information based on object distance information and the focal length information.

6. The control apparatus according to claim 5, wherein based on the object distance information at each of a first timing and a second timing, the focal length information at each of the first timing and the second timing, and the object size information acquired by the first method at the first timing, the second method is a method of acquiring the object size information at the second timing.

7. The control apparatus according to claim 1, wherein the imaging control unit performs the exposure based on the object size information acquired by the first method in capturing a first image in the continuous imaging, and performs the exposure based on the object size information acquired by the second method in capturing second and subsequent images in the continuous imaging.

8. The control apparatus according to claim 7, wherein the imaging control unit performs the exposure based on the object size information acquired by the first method or the second method selected according to a predetermined condition in capturing the second and subsequent images.

9. The control apparatus according to claim 8, wherein the predetermined condition includes at least one of reliability of the object distance information and reliability of the object size information.

10. The control apparatus according to claim 9, wherein the reliability of the object distance information is calculated based on a difference between the object distance information at a second timing predicted from the object distance information detected at a first timing and the object distance information detected at the second timing.

11. The control apparatus according to claim 9, wherein the reliability of the object size information is calculated based on a difference between the object size information at a second timing predicted from the object size information acquired at a first timing and the object size information detected at the second timing.

12. The control apparatus according to claim 9, wherein the imaging control unit performs the exposure based on the object size information acquired by the second method when the reliability of the object distance information is higher than a first reliability.

13. The control apparatus according to claim 12, wherein the imaging control unit performs the exposure based on the object size information acquired by the first method when the reliability of the object distance information is higher than a second reliability.

14. The control apparatus according to claim 13, wherein the first reliability is higher than the second reliability.

15. The control apparatus according to claim 9, wherein the imaging control unit performs the exposure based on the object size information acquired by the first method when the reliability of the object distance information is lower than the reliability of the object size information, and performs the exposure based on the object size information acquired by the second method when the reliability of the object distance information is higher than the reliability of the object size information.

16. An imaging apparatus comprising:
an image sensor configured to photoelectrically convert an optical image formed via an optical system to output image data; and
a processor is configured to function as an information acquisition unit configured to acquire object size information indicating an object size in an image from image data by a first method and a second method in continuous imaging, and an imaging control unit configured to perform an exposure while performing follow-up drive of the optical system so as to reduce a difference between the object size information and target size information,
wherein a time period from a completion of last imaging to an acquisition of the object size information by the second method is shorter than a time period from a completion of last imaging to an acquisition of the object size information by the first method.

17. The imaging apparatus according to claim 16, wherein the image sensor includes a plurality of photoelectric conversion elements that share one micro lens and are configured to receive light passing through mutually different pupil regions in the optical system, and
wherein the imaging apparatus further comprises an object distance detection unit configured to detect object distance information based on signals from the plurality of photoelectric conversion elements.

18. A control method comprising the steps of:
acquiring object size information indicating an object size in an image from image data by a first method and a second method in continuous imaging; and
performing an exposure while performing follow-up drive of an optical system so as to reduce a difference between the object size information and target size information,
wherein a time period from a completion of last imaging to an acquisition of the object size information by the second method is shorter than a time period from a completion of last imaging to an acquisition of the object size information by the first method.

19. A non-transitory computer-readable storage medium storing a program for causing a computer to execute the following steps:
acquiring object size information indicating an object size in an image from image data by a first method and a second method in continuous imaging; and
performing an exposure while performing follow-up drive of an optical system so as to reduce a difference between the object size information and target size information,
wherein a time period from a completion of last imaging to an acquisition of the object size information by the second method is shorter than a time period from a completion of last imaging to an acquisition of the object size information by the first method.

* * * * *